United States Patent [19]

Wuu et al.

[11] Patent Number: 5,471,552
[45] Date of Patent: Nov. 28, 1995

[54] FABRICATION OF STATIC-ALIGNMENT FIBER-GUIDING GROOVES FOR PLANAR LIGHTWAVE CIRCUITS

[75] Inventors: Dong-Sing Wuu; Tzung-Rue Hsieh; Tzy-Ying Lin; Hong-Ming Chen, all of Hsinchu, Taiwan

[73] Assignee: Industrial Technology Research Institute, Hsinchu, Taiwan

[21] Appl. No.: 391,850

[22] Filed: Feb. 22, 1995

[51] Int. Cl.$^6$ ............................... G02B 6/30; G02B 6/10
[52] U.S. Cl. .................... 385/49; 156/659.11; 385/129
[58] Field of Search ...................... 385/49–52, 129–132, 385/147, 146; 156/333, 643, 647, 656, 668, 659.1, 904

[56] References Cited

U.S. PATENT DOCUMENTS

| | | | |
|---|---|---|---|
| 4,217,032 | 8/1980 | Sheem | 350/96.21 |
| 4,522,463 | 6/1985 | Schwenda et al. | 350/96.21 |
| 4,548,467 | 10/1985 | Stoerk et al. | 350/96.21 |
| 4,810,049 | 3/1989 | Fischer et al. | 350/96.21 |
| 4,810,557 | 3/1989 | Blonder | 385/49 X |
| 4,953,936 | 9/1990 | Regener et al. | 350/96.17 |
| 4,966,433 | 10/1990 | Blonder | 385/49 |
| 5,018,817 | 5/1991 | Suzuki et al. | 350/96.17 |
| 5,046,809 | 9/1991 | Stein | 385/49 |
| 5,123,068 | 6/1992 | Hakoun et al. | 385/49 X |
| 5,175,781 | 12/1992 | Hockaday et al. | 385/49 |
| 5,197,109 | 3/1993 | Ichigi et al. | 385/50 |
| 5,217,568 | 6/1993 | Tessier et al. | 156/659.1 |
| 5,280,550 | 1/1994 | Palliaux et al. | 385/50 |
| 5,297,228 | 3/1994 | Yanagawa et al. | 385/49 X |
| 5,299,276 | 3/1994 | Okamura et al. | 385/49 X |
| 5,343,544 | 8/1994 | Boyd et al. | 385/49 X |
| 5,359,687 | 10/1994 | McFarland et al. | 385/49 |

Primary Examiner—Akm E. Ullah
Attorney, Agent, or Firm—W. Wayne Lianh

[57] ABSTRACT

A method for fabricating planar lightwave circuits with at least one static-alignment fiber-guiding groove comprising the steps of: (a) fabricating a sandwiched Si-substrate by forming an etching stop layer on a first Si layer, followed by forming a second Si layer on the etching stop layer; (b) forming a waveguide layer on the Si-substrate, the waveguide layer containing at least one planar waveguide channel buried between a first cladding layer and a second cladding layer; (c) forming a photomask on the waveguide layer so as to allow the fiber-guiding grooves to be fabricated; (d) using the photomask and a first reactive ion etching procedure to form a first portion of the fiber-guiding groove, the first reactive ion etching procedure is controlled such that it etches through the waveguide layer and stops at the second Si layer; and (e) using the photomask and a second reactive ion etching procedure to form a second portion of the fiber-guiding groove, wherein the second reactive etching ion is selected in such a manner that the second reactive ion etching procedure etches only through the second Si layer and stops at the interface between the second Si layer and the etching stop layer. In a preferred embodiment, the etching stop layer comprises a glass material which is resistant to the second reactive etching ion, the fiber-guiding groove is a U-shaped groove, and the waveguide channel has a refractive index which differs from that of the first and second cladding layers by about 0.25%. The etching stop layer provides precise depth control and ensures the repeatability of light coupling efficiency between the optical fiber and the waveguide, a critical element in lightwave circuits.

20 Claims, 4 Drawing Sheets

FABRICATION OF STATIC-ALIGNMENT FIBER-GUIDING GROOVES FOR PLANAR LIGHTWAVE CIRCUITS

FIELD OF THE INVENTION

The present invention relates to the fabrication of improved planar lightwave circuits. More specifically, the present invention relates to the fabrication of planar lightwave circuits with improved fiber-guiding grooves for optically coupling an optical fiber to a planar optical waveguide. The fiber-guiding grooves disclosed in the present invention are fabricated using a reactive ion etching process which provide improved static-alignment, as well as improved reproducibility and reliability thereof, between the optical and the planar optical waveguide. The present invention also relates to integrated optic chips containing the improved static-alignment fiber-guiding grooves that provide improved repeatability in the light coupling efficiency between optical fibers placed in such fiber-guiding grooves and a waveguide, against which the optical fibers are abutted.

BACKGROUND OF THE INVENTION

Optical waveguide chips, which contain one or more planar waveguides, are used as optical components in constructing an optical communication system. In order for an optical waveguide chip to function as an optical component in an optical communication system, optical fibers are connected to the planar optical waveguides formed in the optical waveguide chip. In providing this connection, the optical waveguide chip is first positioned and fixed in a special casing, and an optical fiber is then abutted against one end of the planar optical waveguide. The optical fiber to be connected to the waveguide is first properly positioned to allow maximum light transition, and then bonded thereto by an adhesive or other suitable means.

U.S. Pat. No. 5,297,228 teaches a method for connecting an optical fiber to a planar optical waveguide by which an end face of a waveguide chip, in which planar optical waveguides are formed, is abutted against an end face of a fiber aligning jig, on which optical fibers are arranged, to thereby connect the optical fiber to the corresponding planar optical waveguide. In the method disclosed in the '228 patent, at least one marker is formed in each of the waveguide chips and the fiber aligning jigs, and also at least one pin guide groove is formed in each of the waveguides and the fiber aligning jigs, using the marker as a reference mark. The reference markers are necessary because the Si substrate, from which the waveguide chip and the fiber aligning jigs are made, has metallic luster. V-grooves are cut on the surfaces of the waveguide chip and the fiber aligning jigs by slicing to prevent unwanted movement after axis aligning procedures.

U.S. Pat. No. 5,280,550 discloses a method for coupling an optical fiber to an optoelectronic component having an optical waveguide embedded in a substrate, the waveguide opens into a notch formed on a first face of the substrate. The method disclosed in the '550 patent includes the steps of: (1) pre-positioning the optical fiber in a V-shaped groove of an optical fiber support, the groove terminating at a first surface of the optical fiber support; (2) positioning the fiber support such that the first surface of the substrate and the first surface of the fiber support are directly opposite each other, the first faces forming a gap therebetween; and (3) positioning an end of the optical fiber to be in the notch such that the waveguide and the optical fiber are optically aligned. The V-shaped grooves of the fiber support are obtained by molding method.

U.S. Pat. No. 4,966,433 discloses a optical device in which a substrate-supported waveguide is aligned with an optical fiber. The optical alignment is facilitated by locating the optical fiber in a preferentially etched groove in the substrate supporting the waveguide. Optical coupling is facilitated by a ledge structure overhanging a sloping etched wall of a groove holding the fiber.

U.S. Pat. No. 5,175,781 discloses a method of attaching an optical fiber to an integrated optic chip which includes the step of first forming an alignment groove in the waveguide surface of the integrated optic chip by utilizing a laser ablation system to remove a predetermined portion of the integrated optic chip material. Then, a transversal groove is cut normal to the alignment groove. An optical fiber is disposed within the alignment groove, and the fiber core is optically aligned with the optical axis of the waveguide by translational and rotational positioning of the fiber end face adjacent to the cut surface.

U.S. Pat. No. 5,217,568 discloses a process for etching a silicon substrate to form a V-groove by first applying a coating of a poly(benzocyclobutene) resin on the substrate. Selected portions of the polymer coating layer was removed to expose the underlying silicon, whereby the remaining coating protects the silicon at the adjacent region. Finally, the substrate is contacted with an alkaline solution to anisotropically etch the exposed silicon at the selected region to form a groove.

U.S. Pat. No. 5,046,809 discloses a coupling arrangement for optically coupling a fiber to a planar optical waveguide integrated on a substrate in silicon micro mechanical units. The coupling arrangement provides a fiber arranged in a V-shaped groove of the substrate, leading to the planar waveguide and terminating in a low-attenuation butt coupling between the fiber and the planar optical waveguide. The V-shaped grooves are manufactured by anisotropic etching in a silicon crystal having the orientation 100.

U.S. Pat. Nos. 5,197,109, 5,018,817, 4,953,936, 4,810,049, 4,522,463, and 4,217,032 also disclose optical coupling devices involving optical fibers and waveguides. In all the optical coupling arrangements disclosed hereinabove, the fiber-guiding grooves, which can be formed by etching, mechanical cutting, or laser cutting, are a very important element which provide the desired alignment. However, at the present time, it is still difficult to precisely, and with good repeatability, control the depth of the optical fiber-guiding grooves. The difficulty is more profound with the reactive ion etching technique to form these grooves, which typically have a depth of greater than 35 μm and preferably should have an error within 0.5 μm. At the present time, the error is typically greater than about 2 μm when the grooves are formed using the reactive ion etching technique. This error greatly and adversely affects the repeatability in the light coupling efficiency between optical fibers and the waveguide.

SUMMARY OF THE INVENTION

The primary object of the present invention is to develop a method, which improves the microscopic depth control of the fiber-guiding grooves for use in planar lightwave circuits. More specifically, the primary object of the present invention is to develop a method of forming fiber-guiding grooves for use in planar lightwave circuits which provides improved precision in controlling the depth of the fiber-guiding grooves, so as to improve the coupling efficiency between optical fibers and waveguides being coupled, and enhance the repeatability in the amount of light transmission therebetween.

In the method disclosed in the present invention, a substrate, from which an optical waveguide chip is to be made, is first formed as laminated layers consisting of a layer of glass material and a Si layer using flame hydrolysis deposition technique or other appropriate techniques. Then U-shaped grooves (i.e., Si U-grooves) are formed on the Si layer using reactive ion etching or other appropriate etching techniques. The reactive ions are selected such that they only effect the Si layer but will not affect the glass layer. Because the glass material is resistant to the etching ions selected for the Si layer, it serves as an etching-stop layer. By using the laminated substrate structure which has such an etching layer of glass material, the depth of the fiber-guiding U-grooves can be precisely controlled. This ensures the repeatability of the light coupling efficiency between the optical fibers and the waveguides. The present invention thus solves the long-felt problem which has become a bottleneck in the manufacturing of integrated optic chips requiring reliable coupling efficiency between the optical fibers and the waveguide.

BRIEF DESCRIPTION OF THE DRAWING

The present invention will be described in detail with reference to the drawings showing the preferred embodiment of the present invention, wherein.

DETAILED DESCRIPTION OF THE PREFERRED EMBODIMENT

Figure 1:
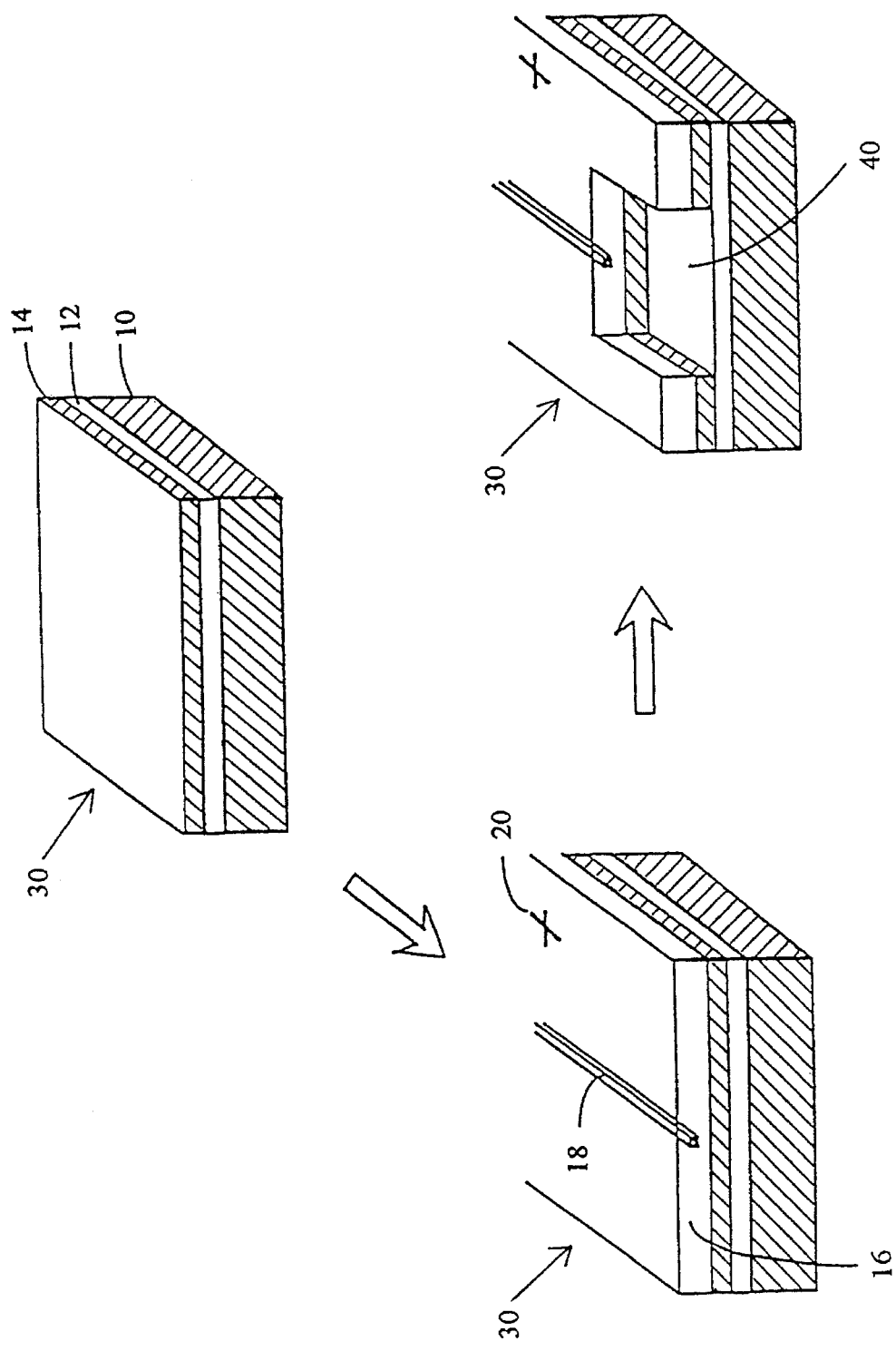
FIG. 1 is a schematic flow chart diagram showing the steps of the method disclosed in the present invention for fabricating improved optical fiber-guiding grooves for use in planar lightwave circuits.

The present invention discloses a method for fabricating static-alignment fiber-guiding grooves for coupling optical fibers with a waveguide provided in a planar lightwave circuit. In the method disclosed in the present invention, an etching stop layer is sandwiched between at least two Si layers. The etching layer is made of an etching-resistant material, such as silica glass or other appropriate glass material, and is formed using the flame hydrolysis technique. The optical fiber-guiding U-shaped grooves (i.e., Si U-grooves) in the present invention are formed on the Si layer using reactive ion etching or other appropriate etching techniques. The reactive ions selected for the Si layer are chosen so that they only effect the Si layer but will not affect the glass layer. Because the glass material is resistant to the etching ions selected for the Si layer, it provides a reliable means for precisely controlling the depth of the fiber-guiding U-grooves so as to provide repeatable coupling efficiency between the optical fibers and the waveguide.

Now referring to the drawings, the present invention will now be described more specifically with reference to the following example. It is to be noted that the following descriptions of the example including preferred embodiment of this invention are presented herein for purpose of illustration and description; it is not intended to be exhaustive or to limit the invention to the precise form disclosed.

FIG. 1 is a schematic flow chart diagram showing the steps of a preferred embodiment of the method disclosed in the present invention for fabricating improved optical fiber-guiding grooves for use in planar lightwave circuits. In FIG. 1, it is first shown a novel Si substrate 30 comprising a silica glass layer 12, sandwiched between an upper Si layer 14 and a lower Si layer 10. Then a channel waveguide 18 embedded in a cladding layer 16 is formed on top of the upper Si layer 14. An alignment marker 20 is shown to have been formed on the surface of the upper Si layer 14. Finally, a U-shaped groove 40 is shown to have been formed through both the upper Si layer 14 and the cladding layer 16; it is also shown that the depth of the U-shaped groove stops at the silica glass layer 12.

Figure 2:
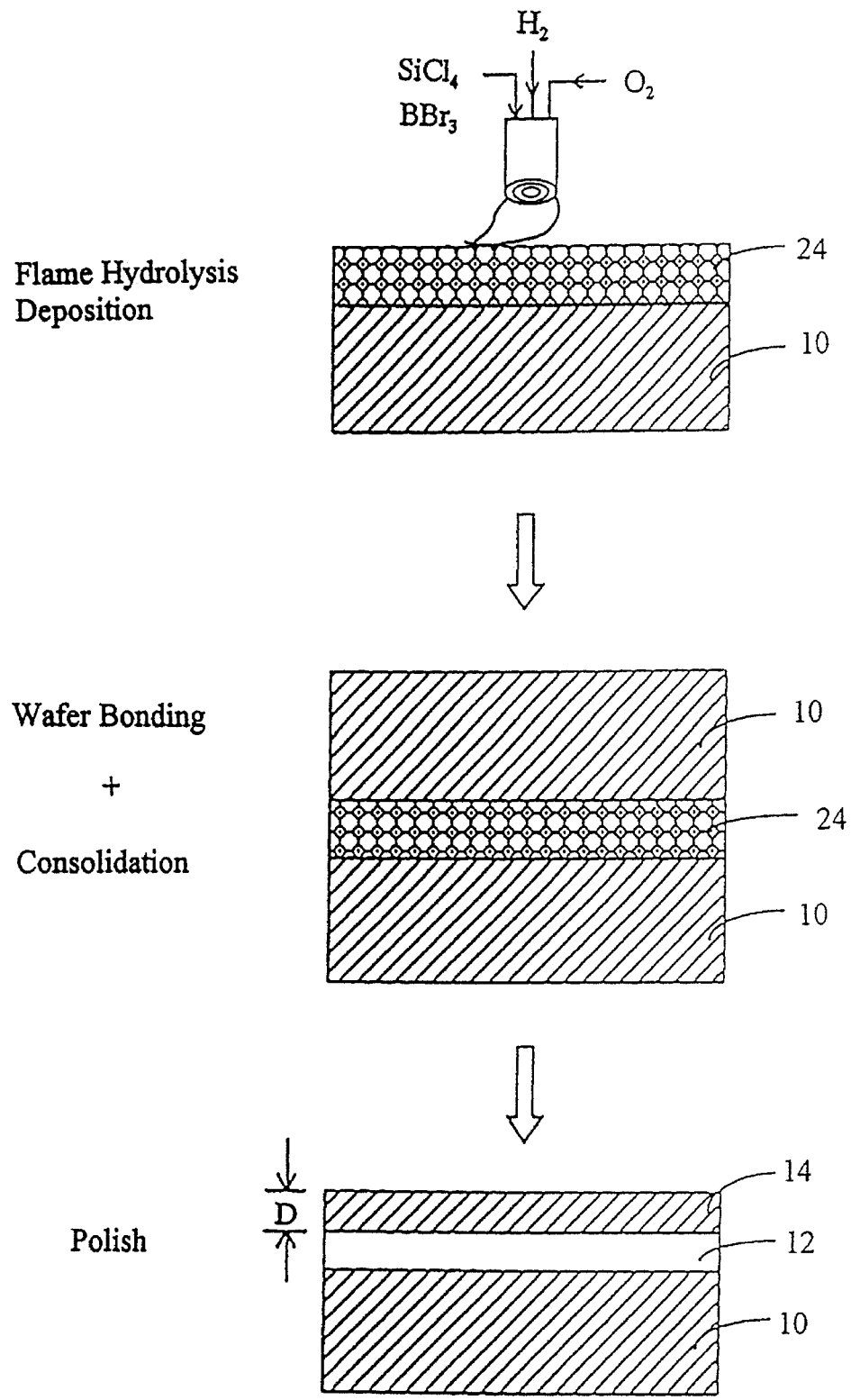
FIG. 2 is a schematic flow chart diagram showing the steps of fabricating the laminated substrate of the present invention in which the glass layer serves as an etching stop in subsequent reactive ion etching steps.

FIG. 2 is a schematic flow chart diagram showing the steps of fabricating the laminated substrate 30 according to a preferred embodiment of the present invention in which the glass layer 12, which is sandwiched between an upper Si layer 14 and a lower Si layer 10, serves as an etching stop in subsequent reactive ion etching steps. In the first step, a precursory glass layer 24 is deposited on the lower Si layer 10 by a flame hydrolysis deposition technique. Similarly, a second Si layer 10' is formed on top of the precursory glass layer 24. After wafer bonding, consolidation, and polishing, the second becomes an upper Si layer 14, and the precursory glass layer 24 becomes the etching stop layer 12. The upper Si layer 14 is polished to a depth of "D". Typically, with an optical fiber having an outer diameter of 125 µm, the upper Si layer is polished to a depth "D" of 38.5 µm.

Figure 3A:
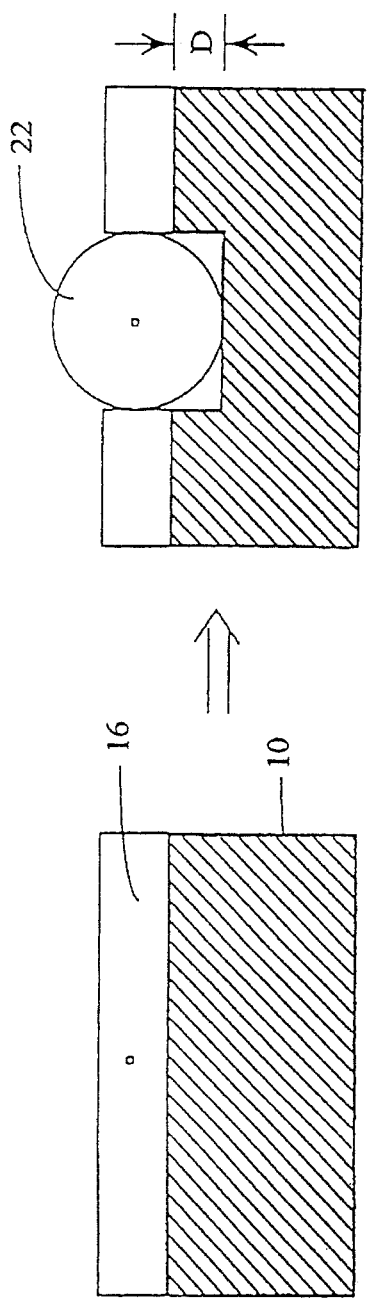
FIG. 3A is a schematic diagram showing how the optical fiber is placed in a conventional optical fiber-guiding groove.
Figure 3B:
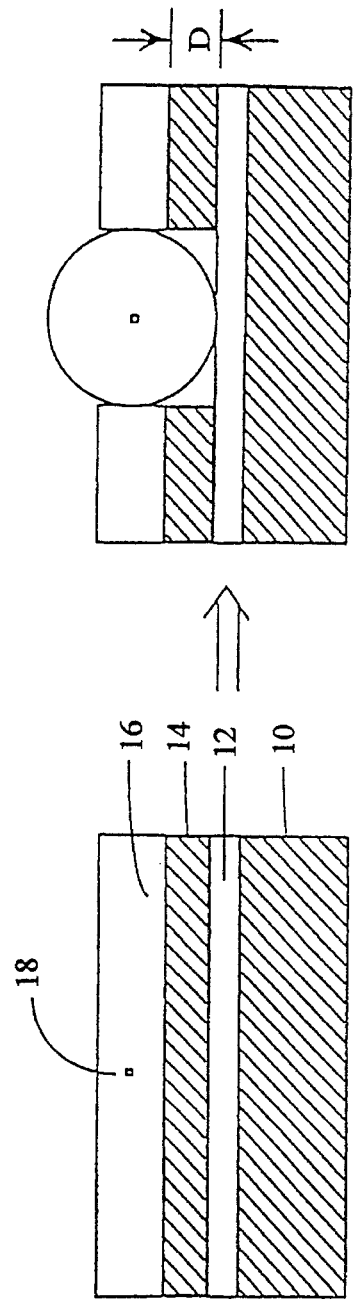
FIG. 3B is a schematic diagram showing how the optical fiber is placed in an optical fiber-guiding groove of the present invention.

FIG. 3A is a schematic diagram showing how an optical fiber 22 is placed in a conventional optical fiber-guiding groove. The substrate of the waveguide chip consists only of an Si layer 10 and a cladding layer 16, which contains the channel waveguide 18. FIG. 3B is a schematic diagram showing how the optical fiber 16 is placed in an optical fiber-guiding groove of the present invention. In the present invention, as shown in FIG. 3B, the substrate of the waveguide chip consists of, in the order from the bottom to the top, a lower Si layer 10, an etching stop layer, an upper Si layer 14, and a cladding layer 16, which contains the channel waveguide 18.

Figure 4:
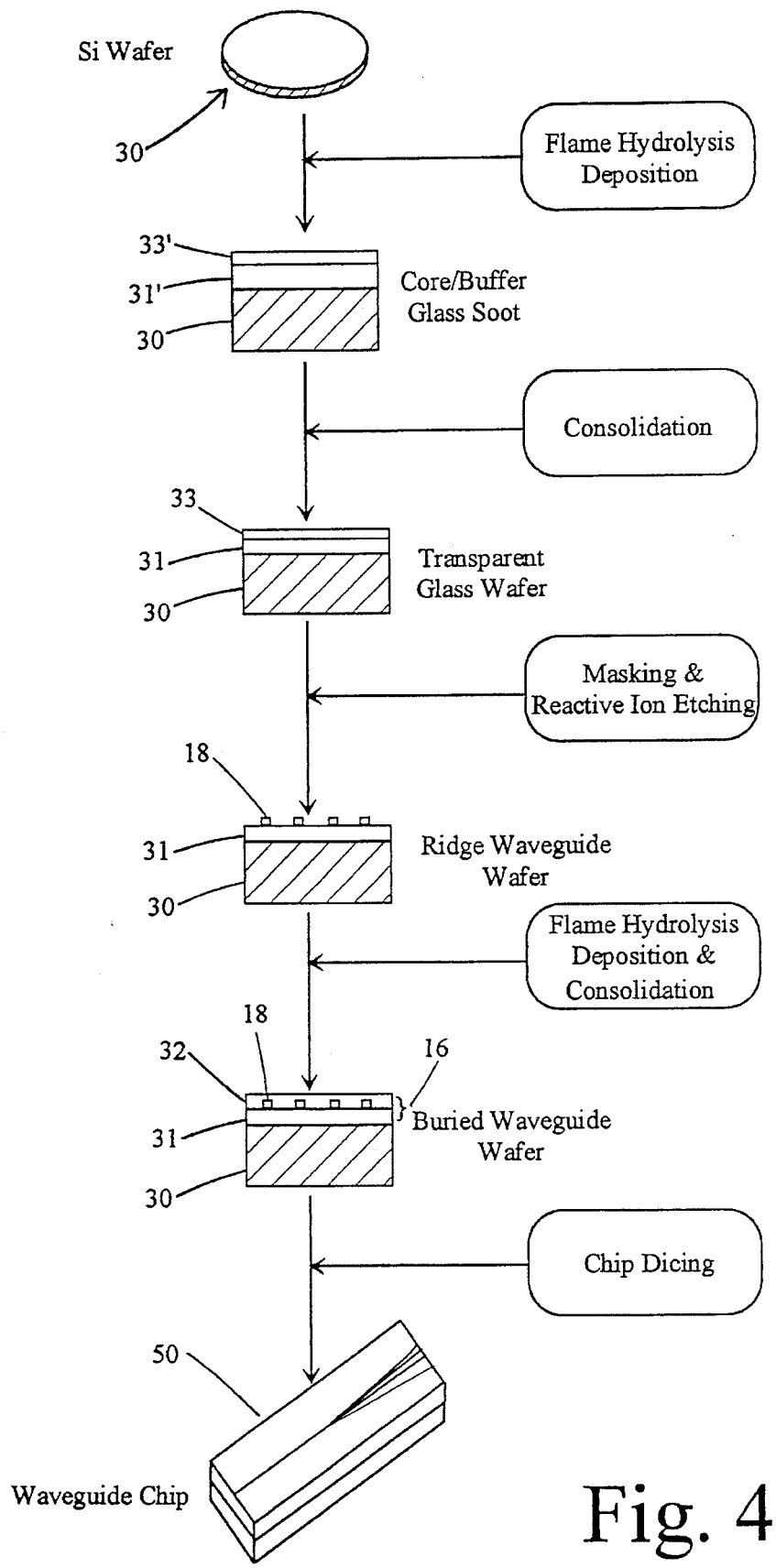
FIG. 4 is a schematic flow chart diagram showing the steps of fabricating a waveguide chip according to a preferred embodiment of the present invention.

FIG. 4 is a schematic flow chart diagram showing the detailed steps of fabricating a waveguide chip 50 according to a preferred embodiment of the present invention. The sandwiched substrate 30, or Si wafer, prepared from the steps described in FIG. 2 is deposited, using the flame hydrolysis technique, with a glass soot layer 31' and a core layer 33'. The difference in the refractive index between these two layers after subsequent processing procedure is designed to be about 0.25%. After shrinkage by consolidation, a transparent glass wafer containing an under cladding 31 of 20 µm thick and a core layer 33 of 8 µm are formed. Subsequently, a ridge waveguide wafer containing channel-shaped planar waveguides 18 is formed by first using the conventional α-Si sputtering, followed by photolithography, and reactive ion etching. Other mask materials, such as chromium, poly-Si, titanium, etc., can be used other than α-Si, and the mask layer can be formed using the techniques of PECVD, E-gun, thermal evaporating, etc., in addition to the sputtering technique. An alignment marker corresponding to the alignment marker 20 shown in FIG. 1 is also formed by the α-Si sputtering, photolithography and reactive ion etching. Thereafter, a buried waveguide wafer is created by forming an upper cladding 32 of about 30 μm, which buries the channel-shaped planar waveguides 18, by flame hydrolysis deposition and consolidation. Finally, individual waveguide chips containing the elements described above are fabricated by chip dicing.

After the waveguide chip is fabricated according to the procedure described in FIG. 4 but before dicing, another mask layer, such as an α-Si layer is formed on the surface thereof by sputtering technique. The surface patterns of the U-shaped fiber-guiding grooves and the alignment marks are then formed on the α-Si mask by the conventional photolithographic process to form photomasks, followed by a first reactive ion etching procedure. As described above, other masking materials, such as chromium, poly-Si, titanium, etc., can be used other than the α-Si mask, and the mask layer can be formed using the techniques of PECVD, E-gun, thermal evaporating, etc., in addition to the sputtering technique. The first reactive ion etching procedure stops at the upper Si layer, which is shown as numeral 14 in FIGS. 1 and 2. Then using this mask, a second reactive ion etching procedure is applied to the upper Si layer 14. The reactive ions used in the second reactive ion etching procedure are selected so that they are effective only with respect to the Si layer, and are ineffective (i.e., non-reactive) with respect to the glass layer, thereby the reactive ion etching reaction automatically stops at the glass layer, which is indicated as numeral 12 in FIG. 1. The glass layer 12 serves as an etching stop layer respective to the Si layer 14. The method disclosed in the present invention thus provides a precise and reliable control for the depth of the alignment guiding-grooves that are to be fabricated on the waveguide chips. The method disclosed in the present invention significantly improves the repeatability in the coupling efficiency between the optical fibers and the waveguide, to which the optical fibers are connected. Furthermore, since the method disclosed in the present invention utilizes the flame hydrolysis deposition method to form the etching resistance, it can be implemented using existing technology and facility without incurring large additional expenses.

By comparing FIGS. 3A and 3B, the advantage of the present invention can be readily recognized. With the conventional process, which is shown in FIG. 3A, the errors in fabricating the depth of the fiber-guiding grooves can be large, typically in the order of 2 μm or more. With the process disclosed in the present invention, which is shown in FIG. 3B, the etching process is stopped at the etching stop layer; therefore, the depth of the fiber-guiding guiding grooves can be exactly controlled, and the error can be reduced to less than 1 μm, or even less than 0.5 μm. By controlling the precise depth of the guiding grooves, the repeatability in the coupling efficiency between the optical fiber and the waveguide is significantly improved. Furthermore, with the optical lightwave circuits fabricated in the present invention, the coupling loss is reduced to less than 0.3 dB/point, from the 0.6 dB/point, or greater, typically experienced in the prior art devices. Thus, the present invention provides a substantial improvement in the fabrication of planar lightwave circuits, with minimum additional manufacturing cost.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for fabricating planar lightwave circuits with at least one static-alignment fiber-guiding groove comprising the steps of:

(a) fabricating a sandwiched Si-substrate by forming an etching stop layer on a first Si layer, followed by forming a second Si layer on said etching stop layer;

(b) fabricating a waveguide layer on said Si-substrate, said waveguide layer containing a first cladding layer, a second cladding layer, and at least one planar waveguide channel buried between said first cladding layer and said second cladding layer;

(c) forming a photomask on said waveguide layer so as to allow at least one fiber-guiding groove to be fabricated;

(d) using said photomask and a first reactive ion etching procedure to form a first portion of said fiber-guiding groove, said first reactive ion etching procedure is controlled such that it etches through said waveguide layer and stops in said second Si layer; and (e) using a second reactive ion etching procedure to form a second portion of said fiber-guiding groove, wherein said second reactive ion etching procedure is effective with respect to said second Si layer but is ineffective with respect to said etching stop layer, such that said second reaction ion etching stops at an interface between said etching stop layer and said second Si layer so as to provide a precise depth control.

2. A method for fabricating planar lightwave circuits with at least one static-alignment fiber-guiding groove according to claim 1 wherein said etching stop layer comprises a glass material which is resistant to said second reactive ion.

3. A method for fabricating planar lightwave circuits with at least one static-alignment fiber-guiding groove according to claim 2 wherein said etching stop glass layer is formed by a flame hydrolysis deposition process.

4. A method for fabricating planar lightwave circuits with at least one static-alignment fiber-guiding groove according to claim 1 wherein said sandwiched Si substrate is formed by the steps of:

(a) forming said etching stop layer on a first Si layer by a flame hydrolysis deposition technique;

(b) forming a second Si layer on said etching stop layer; and (c) polishing said second Si layer to a predetermined thickness.

5. A method for fabricating planar lightwave circuits with at least one static-alignment fiber-guiding groove according to claim 4 wherein said second Si layer is polished to a predetermined thickness of 38.5 μm so as to accommodate an optical fiber having an external diameter of 125 μm.

6. A method for fabricating planar lightwave circuits with at least one static-alignment fiber-guiding groove according to claim 1 wherein said waveguide layer is fabricated by the steps of:

(a) forming a first glass soot layer and a core layer on said laminated Si-substrate using flame hydrolysis deposition technique;

(b) consolidating said glass soot layer and said core layer by furnacing to form a first cladding layer and a waveguide core layer, respectively;

(c) forming at least one waveguide channel from said waveguide core layer;

(d) forming a second glass soot layer on said waveguide channel and said first cladding layer using a flame hydrolysis deposition technique; and (e) consolidating said second glass soot layer by furnacing so as to form a second cladding layer, wherein said waveguide channel is buried between said first and second cladding layers.

7. A method for fabricating planar lightwave circuits with at least one static-alignment fiber-guiding groove according to claim 6 wherein said waveguide channel is fabricated by the steps of:

(a) forming a mask layer on said waveguide core layer;

(b) using a photolithographic process to form a photomask on said mask layer;

(c) using a reactive ion etching process to form said waveguide channel from said waveguide core layer;

8. A method for fabricating planar lightwave circuits with at least one static-alignment fiber-guiding groove according to claim 1 wherein said waveguide channel has a refractive index which differs from that of said first and second cladding layers by about 0.25%.

9. A method for fabricating at least one static-alignment fiber-guiding groove in a planar lightwave circuit comprising the following steps:

(a) sandwiching an etching stop layer between a first Si layer and a second Si layer so as to form a sandwiched Si-substrate;

(b) forming a waveguide layer on said second Si layer of said Si-substrate, said waveguide layer containing a first cladding layer, a second cladding layer, and at least one planar waveguide channel buried between said first cladding layer and said second cladding layer;

(c) forming a first portion of said fiber-guiding groove through said waveguide layer using a first reactive ion etching procedure; and (d) using a second reactive ion to effectuate a second reactive ion etching procedure so as to form a second portion of said fiber-guiding groove through said second Si layer, wherein said second reactive ion is selected such that it is ineffective with respect to said etching stop layer, and that said second reactive ion etching procedure etches only through said second Si layer and stops at a surface of said etching stop layer.

10. A method for fabricating at least one static-alignment fiber-guiding groove in a planar lightwave circuit according to claim 9 wherein said etching stop layer is a glass layer formed by a flame hydrolysis deposition process.

11. A method for fabricating at least one static-alignment fiber-guiding groove in a planar lightwave circuit according to claim 9 wherein said sandwiched Si substrate is formed by the following steps:

(a) forming said etching stop layer on said first Si layer by a flame hydrolysis deposition technique;

(b) forming said second Si layer on said etching stop layer; and (c) polishing said second Si layer to a predetermined thickness.

12. A method for fabricating at least one static-alignment fiber-guiding groove in a planar lightwave circuit according to claim 9 wherein said waveguide layer is fabricated by the steps of:

(a) forming a first glass soot layer and a core layer on said laminated Si-substrate using a flame hydrolysis deposition technique;

(b) consolidating said glass soot layer and said core layer by furnacing so as to form a first cladding layer and a waveguide core layer, respectively;

(c) forming at least one waveguide channel from said waveguide core layer;

(d) forming a second glass soot layer on said waveguide channel and said first cladding layer using a flame hydrolysis deposition technique; and (e) consolidating said second glass soot layer by furnacing so as to form an a second cladding layer, wherein said waveguide channel is buried between said first and second cladding layers.

13. A method for fabricating at least one static-alignment fiber-guiding groove in a planar lightwave circuit according to claim 9 wherein said waveguide channel has a refractive index which differs from that of said first and second cladding layers by about 0.25%.

14. A method for fabricating at least one static-alignment fiber-guiding groove in a planar lightwave circuit according to claim 9 wherein said fiber-guiding groove is a U-shaped groove.

15. A planar lightwave circuit containing at least one waveguide channel and at least one optical fiber, which is confined in a fiber guiding-groove and coupled to said waveguide channel, said planar lightwave circuit further comprising:

(a) a sandwiched Si-substrate containing an etching stop layer between a first Si layer and a second Si layer;

(b) a waveguide layer formed on said second Si layer of said Si-substrate, said waveguide layer containing a first cladding layer, a second cladding layer, and at least one planar waveguide channel buried between said first cladding layer and said second cladding layer;

(c) at least one fiber-guiding groove consisting of a first portion and a second portion, wherein said first portion of said fiber-guiding groove is formed through said waveguide layer using a first reactive ion etching procedure, and said second portion of said fiber-guiding groove is formed through said second Si layer using a second reactive ion etching procedure, further wherein said second reactive ion etching procedure utilizes a second etching ion which etches only through said second Si layer and stops at an interface surface between said etching stop layer and said second Si layer, so as to provide precise depth control of said fiber guiding groove in accordance with a predetermined depth.

16. A planar lightwave circuit according to claim 15 wherein said etching stop layer comprises a glass material which is resistant to said second reactive etching ion.

17. A planar lightwave circuit according to claim 15 wherein said fiber-guiding groove is a U-shaped groove.

18. A planar lightwave circuit according to claim 15 wherein said waveguide channel has a refractive index which differs from that of said first and second cladding layers by about 0.25%.

19. A planar lightwave circuit according to claim 15 wherein said sandwiched Si substrate is formed by the steps of:

(a) forming said etching stop layer on said first Si layer by a flame hydrolysis deposition technique;

(b) forming said second Si layer on said etching stop layer; and (c) polishing said second Si layer to a predetermined thickness.

20. A planar lightwave circuit according to claim 15 wherein said waveguide layer is fabricated by the steps of:

(a) forming a first glass soot layer and a core layer on said laminated Si-substrate using a flame hydrolysis deposition technique;

(b) consolidating said glass soot layer and said core layer by furnacing so as to form a first cladding layer and a waveguide core layer, respectively;

(c) forming at least one waveguide channel out of said waveguide core layer;

(d) forming a second glass soot layer on said waveguide channel and said first cladding layer using a flame hydrolysis deposition technique; and (e) consolidating said second glass soot layer by furnacing so as to form an a second cladding layer, wherein said waveguide channel is buried between said first and second cladding layers.

* * * * *